July 14, 1970    JAMES E. WEBB    3,520,238
ADMINISTRATOR OF THE NATIONAL AERONAUTICS
AND SPACE ADMINISTRATION
APPARATUS AND METHOD FOR PROTECTING A PHOTOGRAPHIC DEVICE
Filed Dec. 13, 1967    2 Sheets-Sheet 1
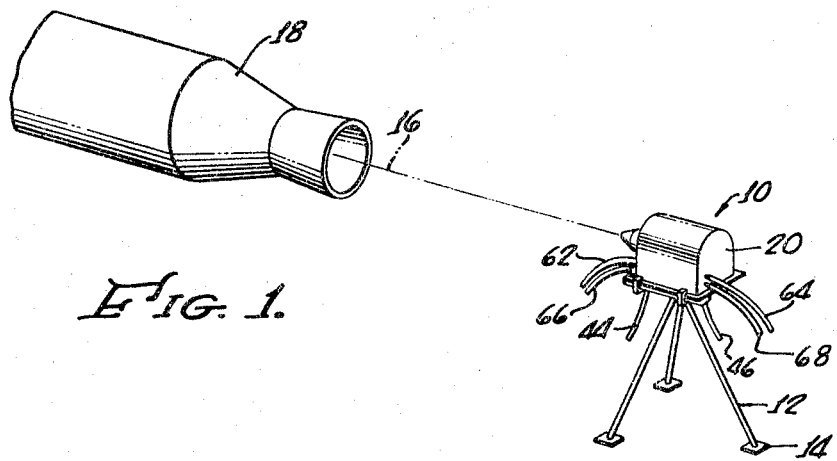
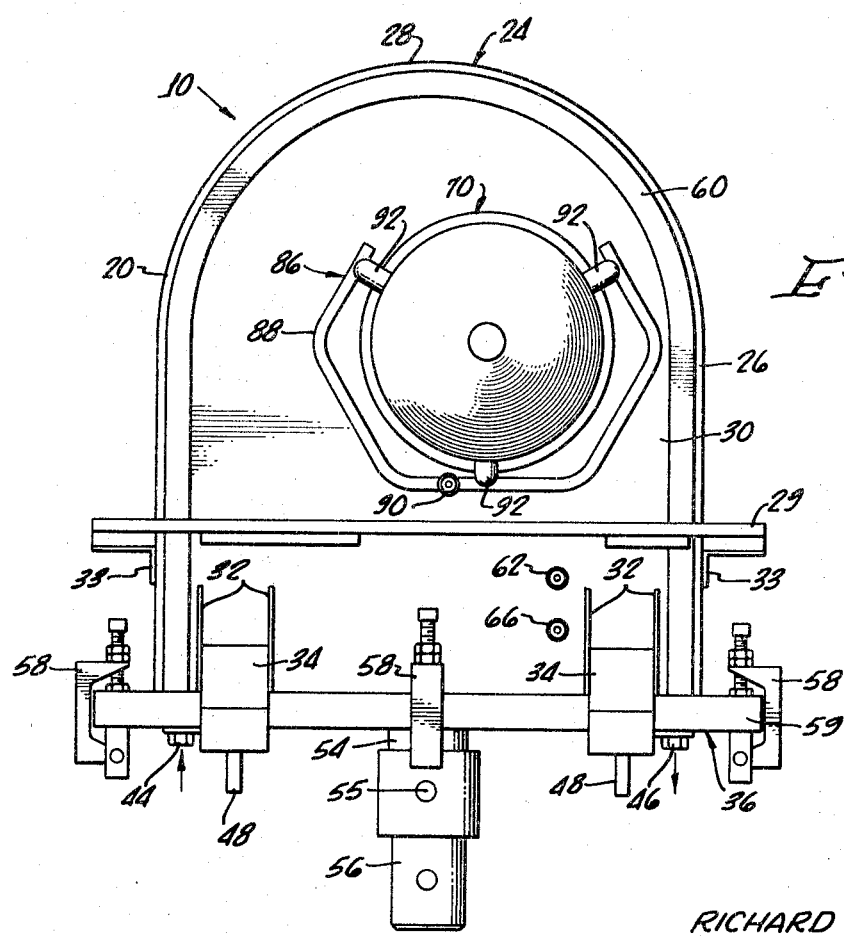
INVENTORS.
RICHARD L. BAILEY
WILLIAM C. TIBBITTS
BY
ATTORNEYS.

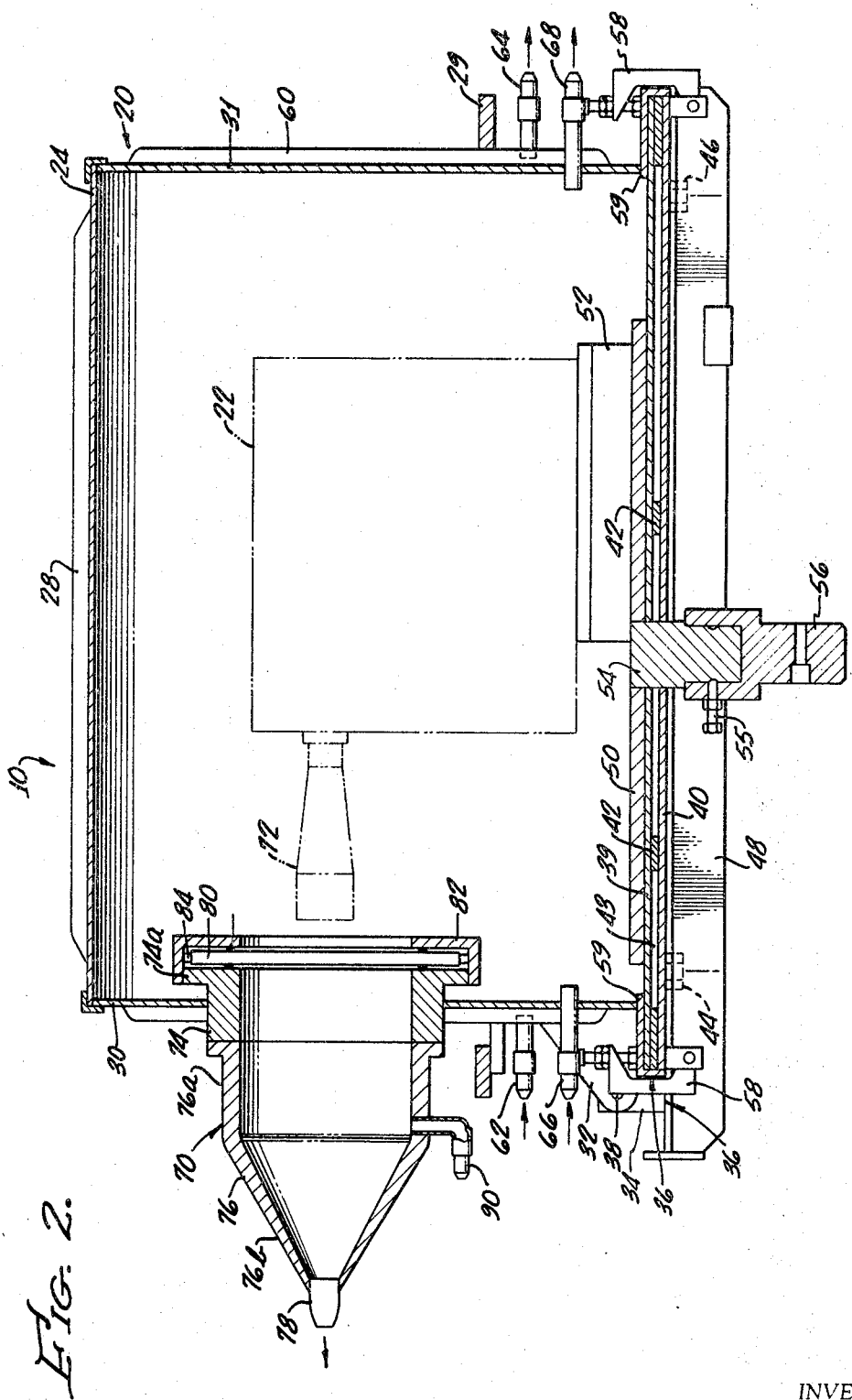

United States Patent Office 3,520,238
Patented July 14, 1970

3,520,238
APPARATUS AND METHOD FOR PROTECTING A PHOTOGRAPHIC DEVICE
James E. Webb, Administrator of the National Aeronautics and Space Administration, with respect to an invention of Richard L. Bailey and William C. Tibbitts, both of Lancaster, Calif.
Filed Dec. 13, 1967, Ser. No. 690,163
Int. Cl. G03b 17/02
U.S. Cl. 95—11                                                    9 Claims

ABSTRACT OF THE DISCLOSURE

A camera to photograph a rocket engine nozzle in operation is positioned within a rugged enclosure cooled by water and pressurized by inert nitrogen to prevent particles from entering the enclosure. A viewing duct in the wall of the enclosure aligned with the camera lens is formed with a protective window at its inner end and a reduced diameter viewing port at its outer end. High pressure gas injected into the duct exhausts through the port as a high pressure jet which deflects the engine exhaust and prevents it from entering the duct and damaging the window or the camera.

ORIGIN OF THE INVENTION

The invention described herein was made in the performance of work under a NASA contract and is subject to the provisions of Section 305 of the National Aeronautics and Space Act of 1958, Public Law 85–568 (72. Stat. 435; 42 USC 2457).

BACKGROUND OF THE INVENTION

This invention relates to a means for protecting a camera or similar device to enable the camera to be utilized to take photographs of a rocket nozzle or other engine component while the camera is located in high temperature exhaust of a rocket or engine.

In the development and testing of high temperature systems such as rocket engines or gas turbines, it is highly desirable to be able to observe the erosion of the engine components while in operation. It is also desirable in some instances to study the high temperature exhaust gas stream from the engine. This of course requires that the camera be protected from the high temperatures and pressures that exist and also from the high velocity particles which are often present, particularly in solid propellant rockets. These problems are most severe if the photographic device is positioned directly in the exhaust stream where it is often desirable to make observations.

While there have been some attempts to protect a camera properly in such extreme environments these have only been partially successful and in many instances observation of the erosion of a rocket engine nozzle for example has been limited to study after the engine is shut off.

It is also desirable that the camera protective apparatus be a self-contained unit which can function without expensive engine modification, and which can be moved to various locations for performing observation functions in a variety of extreme environments.

SUMMARY OF THE INVENTION

In accordance with the invention, the apparatus for protecting a camera while photographing a rocket engine nozzle or similar situation includes a rugged enclosure surrounding the camera, with the enclosure having a viewing duct in one wall which tapers from a large inner diameter to a small diameter nozzle at its outer end. A strong window extends across the duct to permit light to enter the enclosure while protecting the camera lens. High pressure gas introduced into the duct exhausts through the viewing duct nozzle as a high velocity jet which deflects the engine exhaust gases and particles and prevents them from entering the duct and damaging the protective window. Preferably, the enclosure walls are formed with a plurality of passages for ducting cooling fluid therethrough to maintain the temperature within the enclosure at a level satisfactory for the camera. Also, to minimize the possibility of particles entering the enclosure, a pressurized inert gas is ducted through the enclosure to maintain a positive pressure within the enclosure at all times. With this combination of a pressurized camera zone with auxiliary water cooling and a gas-swept viewing zone, a rocket engine nozzle may be satisfactorily photographed in operation without damaging the camera equipment.

BRIEF DESCRIPTION OF THE DRAWINGS

For a more thorough understanding of the invention reference may be had to the following detailed description and drawings wherein:

FIG. 1 is a schematic view showing the photographic device of the invention in position to photograph a rocket engine nozzle;

FIG. 2 is an enlarged side cross-sectional view of the protective enclosure of the invention; and FIG. 3 is an elevational view of the left end of the enclosure of FIG. 2.

DESCRIPTION OF THE PREFERRED EMBODIMENT

In FIG. 1, the photographic device 10 of the invention is shown mounted on a tripod 12 anchored securely in a supporting surface 14 with the device aligned on the axis 16 of a rocket engine nozzle 18. The photographic device 10 may be seen in FIGS. 2 and 3 to include a strong, rugged enclosure 20 surrounding a camera 22. The enclosure 20 includes an inverted U-shaped, upper portion 24 having side walls 26, a top wall 28, and end walls 30 and 31. A supporting frame 29 attached to the walls 26, 30, and 31 by angle brackets 33 provide additional strength to the unit.

The side, top and end walls of the upper portion 24 of the enclosure are provided with a plurality of interconnected passages schematically illustrated at 60 for circulating coolant such as water for cooling the interior of the enclosure. Coolant is admitted to the passages 60 through an inlet 62 in the front wall 30 of the upper portion 24 of the enclosure 20, passes through the passages 60 in the front, side, top and rear walls and leaves the passages through an outlet 64 in the rear wall 31 of the enclosure.

Two pair of spaced vertically oriented lug plates 32 are attached to the lower portion of the front wall 30. A pair of spaced lugs 34 mounted on a base assembly 36 extend between the lug plates 32. A pivot pin 38 extending through each lug 34 and each pair of lug plates 32 connects the upper portion 24 of the enclosure to the base assembly 36.

As can be seen from FIG. 2, the base assembly 36 includes a pair of metal plates 39 and 40 which are spaced by a plurality of ribs 42 defining an elongated passage 43 within the base assembly 36. The passage 43 extends from an inlet 44 near the forward end of the base assembly 36 and terminates at an outlet 46 near the rear of the base assembly. The lower plate 40 is mounted on a supporting beam 48 which extends from front to rear at the middle of the base assembly 36. The base assembly further includes a heavy inner supporting plate 50 which is attached to the plate 39 for supporting vertically oriented memers 52 which in turn support the camera 22.

The entire base assembly 36 is attached to a bracing post 54 which as seen in FIG. 2 extends through the plates 39 and 40 and is releasably attached at its lower end by a pin 55 to an upper socket member 56 of the tripod assembly 12, shown in FIG. 1.

The upper portion 24 of the enclosure 20 is secured to the base assembly 36 by a plurality of clamps 58 spaced around the periphery of the base assembly and extending through the base and an outwardly extending flange 59 attached to the side walls 26 and front and rear walls 30 and 31 of the enclosure.

Positioned in the front wall 30 of the enclosure is a gas inlet line 66 which leads into the interior of the enclosure. A gas outlet line 68 extends through the rear wall 31 of the enclosure.

In the front wall 30 of the enclosure, there is also mounted a viewing duct assembly 70 axially aligned with the lens unit 72 of the camera 22. The duct assembly 70 includes a short, heavy cylindrical member 74 and a member 76 having a cylindrical inner end 76a which mates with the cylindrical member 74 and having a frusto-conical outer end 76b which tapers to a relatively small diameter. A tubular nozzle or viewing port 78 positioned within the outer end of the member 76b defines an outlet from the duct assembly 70.

A thick transparent protective quartz window 80 is positioned adjacent an outwardly extending flange 74a on the inner end of the cylindrical member 74 and a surrounding cap 82 attached to the flange 74a secures the window in the position shown. Suitable seals 84 are located around the circumference of the window 80 and on each axial face of the window adjacent its outer periphery to prevent gas leakage around the window.

Referring to FIG. 3, there is shown a manifold assembly 86 including a manifold tube 88 which extends about two-thirds around the circumference of the rear portion 76a of the member 76. A main inlet 90 is connected to the manifold tube 88 and three circumferentially spaced tubes 92 connect the manifold tube 88 to the interior of the duct assembly 70.

In operation, the tripod 12 for the photographic device 10 is securely mounted to the supporting surface 14 at the desired location, spaced to the rear of the rocket engine nozzle 18 on the axis 16, as shown in FIG. 1. The preferred distance between the photographic device 10 and the end of the rocket engine naturally depends on the size of the components involved and the view desired. During one use of the device, it was placed about 7 or 8 feet from the engine and the entire throat of the rocket engine nozzle could be observed. When in position, the upper portion 24 of the enclosure is pivoted upwardly so that the camera 22 may be firmly secured to the support members 52 with its lens unit 72 aligned with the window 80 and the nozzle 78. The upper portion 24 of the enclosure is then closed and clamped to the base assembly 36.

To maintain the interior of the enclosure below a predetermined maximum, such as about 100° F., water is introduced to the inlet 44 and the passage 43 in the base assembly 36 to cool the bottom of the enclosure. Cooling water is similarly supplied through the inlet 62 to the passages 60 within the front, side, and top walls of the upper portion 24 of the enclosure 20. The passages 43 and 60 are sized to handle the volume necessary to keep the temperatures sufficiently low.

The exhaust from the rocket engine produces extremely high temperatures, such as in excess of 2000° F., and also produces a rapidly moving gas stream which introduces considerable force on the device 10 and the tripod 12. Also, in certain applications such as with solid fuel rockets, the exhaust is filled with a large number of rapidly moving particles which would damage the camera 22 or the protective window 80 if the particles contacted these components. Although the upper part 24 of the enclosure 20 is essentially sealed to the base assembly 36, it is still possible that some of these particles might be driven into the interior of the enclosure in view of the air pressure differential involved. To minimize the possibility of such particles entering the enclosure, an inert gas such as nitrogen is supplied through the inlet 66 to the interior of the enclosure 20 and allowed to exhaust through the outlet 68. Nitrogen pressures of approximately 25 pounds per square inch have been found adequate for this purpose.

To provide a wind-swept viewing area for the camera 22 and to protect the window 80 from the high velocity exhaust particles, an inert gas, such as nitrogen, is also fed into the duct assembly 70 through the main manifold inlet 90, manifold tube 88 and tubes 92. This gas exhausts outwardly or forwardly through the nozzle 78 against the force of the rearwardly moving engine exhaust gases. The nitrogen exiting through the nozzle 78 effectively deflects the engine exhaust stream containing the hot gases and the particles which normally would impinge upon and damage the protective window 80.

The viewing duct assembly 70 including the window 80 is of rugged design to withstand pressures of at least 1000 pounds per square inch. Preferably nitrogen is introduced through the manifold assembly at pressures of 600–900 pounds per square inch, to maintain a pressure of about 600 pounds per square inch at the nozzle 78. In a working example of the invention, the nozzle 78 was provided with an inner diameter of approximately one inch. A viewing port of this size permits the entire rocket engine nozzle to be photographed with the camera positioned approximately as indicated above. A smaller diameter port 78 on the viewing duct assembly 70 would require less nitrogen to prevent particles from entering, but it would be necessary to move the camera 22 further from the subject to obtain the same field of vision.

With the arrangement described, it was found that excellent photographs of a rocket engine in operation can be made and thus it is possible to observe the erosion of the rocket nozzle as it occurs. Since the camera unit is self-contained it can be utilized where needed without any engine modification.

While only a single embodiment of the invention has been illustrated and described, it should be understood that various modifications will now be apparent to one skilled in the art. Accordingly, it is intended that all such variations and modifications that are included within the true spirit and scope of the invention be included in the appended claims.

What is claimed is:

1. Apparatus for protecting a photographic device comprising:
   means defining a strong, rugged enclosure surrounding the device;
   a tubular viewing duct extending through one wall of the enclosure and aligned with the lens of the device, the duct having a protective, hermetically sealed window extending across its inner end and having a reduced diameter at its opposite end defining a gas discharge nozzle; and
   means for introducing gas under pressure into the duct to be exhausted from said gas discharge nozzle.

2. The apparatus of claim 1 wherein:
   said viewing duct includes a cylindrical portion positioned in the wall of the enclosure and a frustoconical portion extending outwardly from the cylindrical portion and terminating as the nozzle; and
   the means for introducing high pressure gas into the duct includes a manifold surrounding a portion of the duct and a plurality of tubes connecting the manifold to the interior of the duct.

3. The apparatus of claim 1 wherein the diameter of the viewing duct port is large enough to enable the entire exhaust nozzle of a rocket engine to be photographed when the camera is only a few feet downstream from the end of rocket engine nozzle.

4. The apparatus of claim 1 including means for ducting an inert pressurized as into the interior of the enclosure to maintain a positive pressure therein.

5. The apparatus of claim 1 wherein the enclosure includes:
an upper portion separably connected to a base portion;
means defining passages in the walls of the upper and base portions for ducting coolant to maintain the temperature within the enclosure below a predetermined acceptable level;
inlet and outlet means in the walls of the enclosure for ducting high pressure inert gas through the enclosure to maintain a positive pressure therein; and
means attached to the base of the enclosure for firmly mounting the apparatus in the high temperature, high velocity atmosphere in which the photographs are to be taken.

6. Apparatus for protecting a camera while taking photos in a high temperature atmosphere comprising:
a rugged enclosure surrounding the camera;
means defining passages in the walls of the enclosure for ducting cooling fluid therethrough to maintain the temperature within the enclosure below a predetermined acceptable level;
a viewing duct in one wall of the enclosure aligned with the lens of the camera with a window extending across the duct to protect the lens from high velocity debris in the surrounding atmosphere; and
means for ducting high pressure inert gas into the enclosure to maintain a positive pressure therein.

7. The apparatus of claim 6 wherein the enclosure includes:
a heavy base portion;
an upper portion with one end pivotally attached to the base portion to permit a camera to be easily attached to the base or removed from the base when desired;
means for securing the upper portion to the base portion; and
a rugged support member attached to the bottom side of the base portion for mounting the enclosure in the desired location.

8. A method of protecting a photographic device while photographing a subject in a high temperature, high velocity debris filled atmosphere comprising the steps of:
mounting the photographic device in a strong rugged enclosure with the lens of the device aligned with a viewing duct provided in the wall of the enclosure, the duct having a protective shield across its inner end and having a viewing port at its outer end;
introducing high pressure gas into the interior of the duct while simultaneously exhausting gas from the viewing port;
ducting coolant through the walls of the enclosure; and
ducting inert gas into the interior of the enclosure to maintain a positive pressure therein.

9. The method of claim 8 wherein sufficient gas is introduced to the duct to maintain a pressure of approximately six hundred pounds per square inch at the viewing port and the pressure of the gas within the enclosure is maintained at approximately twenty-five pounds per square inch.

References Cited

UNITED STATES PATENTS

| | | | |
|---|---|---|---|
| 2,959,090 | 11/1960 | Davies | 350—63 |
| 3,289,557 | 12/1966 | Garcia et al. | 95—11 |
| 3,310,356 | 3/1967 | Borberg | 350—63 |
| 3,321,265 | 5/1967 | Clave et al. | 350—63 |
| 3,370,519 | 2/1968 | Garcia et al. | 95—11 |

FOREIGN PATENTS 819,523  9/1959  Great Britain.

NORTON ANSHER, Primary Examiner

R. P. GREINER, Assistant Examiner

U.S. Cl. X.R.

350—63; 352—242